United States Patent [19]

Erickson et al.

[11] Patent Number: 5,060,240

[45] Date of Patent: Oct. 22, 1991

[54] SIMULCAST SYSTEM AND CHANNEL UNIT

[75] Inventors: Paul M. Erickson; John E. Matz, both of Hanover Park; Tim J. Groch, Streamwood; Robert B. Stedman, Hoffman Estates; Mark L. Shaughnessy, Glendale Heights; Taisir Y. Kandah, Hoffman Estates, all of Ill.

[73] Assignee: Motorola, Inc., Schaumburg, Ill.

[21] Appl. No.: 310,797

[22] Filed: Feb. 14, 1989

[51] Int. Cl.[5] .......... H04B 7/00

[52] U.S. Cl. .......... 375/38; 455/53

[58] Field of Search .......... 375/38, 40, 102; 455/18, 33, 51, 53, 54, 56, 57; 370/108, 94.2

[56] References Cited

U.S. PATENT DOCUMENTS

| | | | |
|---|---|---|---|
| 4,255,814 | 3/1981 | Osborn | 455/51 |
| 4,363,129 | 12/1982 | Cohn et al. | 455/22 |
| 4,475,246 | 10/1984 | Batlivala et al. | 455/51 |
| 4,519,068 | 5/1985 | Krebs et al. | 370/94 |
| 4,570,265 | 2/1986 | Thro | 455/56 |
| 4,578,815 | 3/1986 | Persinotti | 455/51 |
| 4,696,052 | 9/1987 | Breeden | 455/5 X |
| 4,775,995 | 10/1988 | Chapman et al. | 455/5 X |
| 4,850,032 | 7/1989 | Freeburg | 455/51 |

*Primary Examiner*—Stephen Chin

*Attorney, Agent, or Firm*—Joseph P. Krause

[57] ABSTRACT

A simulcast broadcast uses digital signal processing techniques to scale pulse coded modulation samples of a signal for broadcast. Samples are adjusted to fully utilize all quantization levels representable by an 8-bit word. Time delay is adjustable using digital techniques by writing and reading data into and out of a RAM. Signal amplitude is adjustable by multiplying samples by a numeric factor. A computer can be used to adjust processing, delay and amplification of the digital signal processor.

27 Claims, 4 Drawing Sheets

10

10

SIMULCAST SYSTEM AND CHANNEL UNIT

BACKGROUND OF THE INVENTION

This invention pertains to radio communications systems. In particular, this invention pertains to simultaneous broadcast or simulcast systems wherein a plurality of remotely sited transmitters simultaneously broadcast identical radio signals at a particular carrier frequency. Maximum signal coverage for a geographic area is provided by having one transmitter for each zone in the area. A problem with simulcast systems occurs however when a portable, transportable, hand-held or other type of mobile radio happens to be positioned between two or more transmitting sites such that it receives equal or nearly equal signal strength carrier signals from two or more transmitters. If the signals modulating the transmitters are of unequal amplitude, unequal phase delay, or unequal modulation the intelligibility of the message may be lost.

Prior art simulcast system inventions have addressed many problems of simulcast systems by including time delays between the program source and the transmitters. Other prior art inventions have provided for adjusting or modifying the signal modulating remote transmitters. Still other prior art systems have disclosed ways of synchronizing remote transmitters so that the broadcast signals from the transmitters are received substantially contemporaneously by a receiver in the field.

Prior art simulcast inventions have generally implemented such solutions using analog signal processing techniques. However, analog time delays, amplitude modulation and transmitter synchronization remedies suffer from the same short comings that make simulcast transmission difficult in and of itself. Analog signal processing techniques suffer from aging and instability and may require realignment by a service technician.

Digital techniques used with simulcast systems have generally been used only to transmit the signal for broadcast to the remote transmitters. Digital communications between the source of the signal for broadcast and the remote transmitters usually produces unacceptable reception by a receiver receiving nearly equal level signals from more than one transmitter. Prior art methods of digitizing of an analog signal using either Mu- or A-law companding, such as those used in standard telephone channel units, produce signal to noise and distortion ratios, (SINAD ratios) too low to produce acceptable modulation of multiple remote transmitters. Broadcast channel units which support higher bandwidth communications produce somewhat better results in simulcast systems but require multiple time slots in a DS-1 frame increasing the cost of a simulcast system.

Accordingly, there exists a need for an improved simulcast system capable of digitally transferring a signal for broadcast to remote transmitters using only a single DS-1 time slot. Such a simulcast system would preferably have SINAD ratios in excess of 40 dB. There also exists a need for a simulcast system capable of adjusting for time delay between each transmitter site and the programming source and be capable of adjusting the amplitude of the signal for broadcast to compensate for differences in the remote transmitters modulation characteristics as well as other equipment in the path to the transmitters.

SUMMARY OF THE INVENTION

The present invention is embodied in a simulcast transmission system that digitally processes a signal for broadcast, including voice, data, or voice and data together. Digital samples of the signal for broadcast are converted at the source end, to digital data words of N-bits having up to $2^N$ quantization levels for each sample. The digital samples are processed such that the magnitude of each sample is adjusted to fully utilize the $2^N$ quantizing levels of each data word. After transmission of the processed data words to the receive channel units the digital words are re-processed to remove the scaling inserted at the source end. The original analog signal for broadcast is then restored prior to transmission.

Processed digital samples are transmitted as 8-bit samples before being converted to a DS-1, pulse coded modulation transmission frame, which is a serial bit stream at a nominal bit rate of 1.544 megabits per second. DS-1 frames comprised of 24 distincts time slots, each time slot having 8 data bits, accommodate up to 24 different conversations or message paths on a time-multiplexed basis. The signal for broadcast over the remote transmitters occupies no more than 1, 8-bit time slot in a DS-1 frame of 24 discrete time slots.

A signal for broadcast, including digital data for broadcast, is first digitized into digital data. The digital data from the A/D, encoded to represent the magnitude of the signal for broadcast at discrete time intervals is digitally processed to normalize groups of sample values in the stream of samples from the A/D similar to how an automatic gain control circuit continually adjusts an analog signal amplitude.

Groups of digital samples are adjusted to insure that each group utilizes the largest number of quantization levels representable by an 8 bit number. Unlike Mu-law or A-law companding, the process of digitizing a signal as used in this invention nearly linearly quantizes the analog signal using all, or nearly all 8 bits of each sample available in a DS-1 time slot, to maximize the SINAD ratio.

Time delay and amplitude adjustment of signals for broadcast is provided for by means of a digital signal processor circuit thereby further reducing sources of distortion in a simulcast system.

Received data is processed in the reverse order. Using an appropriate digital to analog converter, D/A, the original signal is reconstructed.

DETAILED DESCRIPTION OF THE PREFERRED EMBODIMENT

Figure 1:
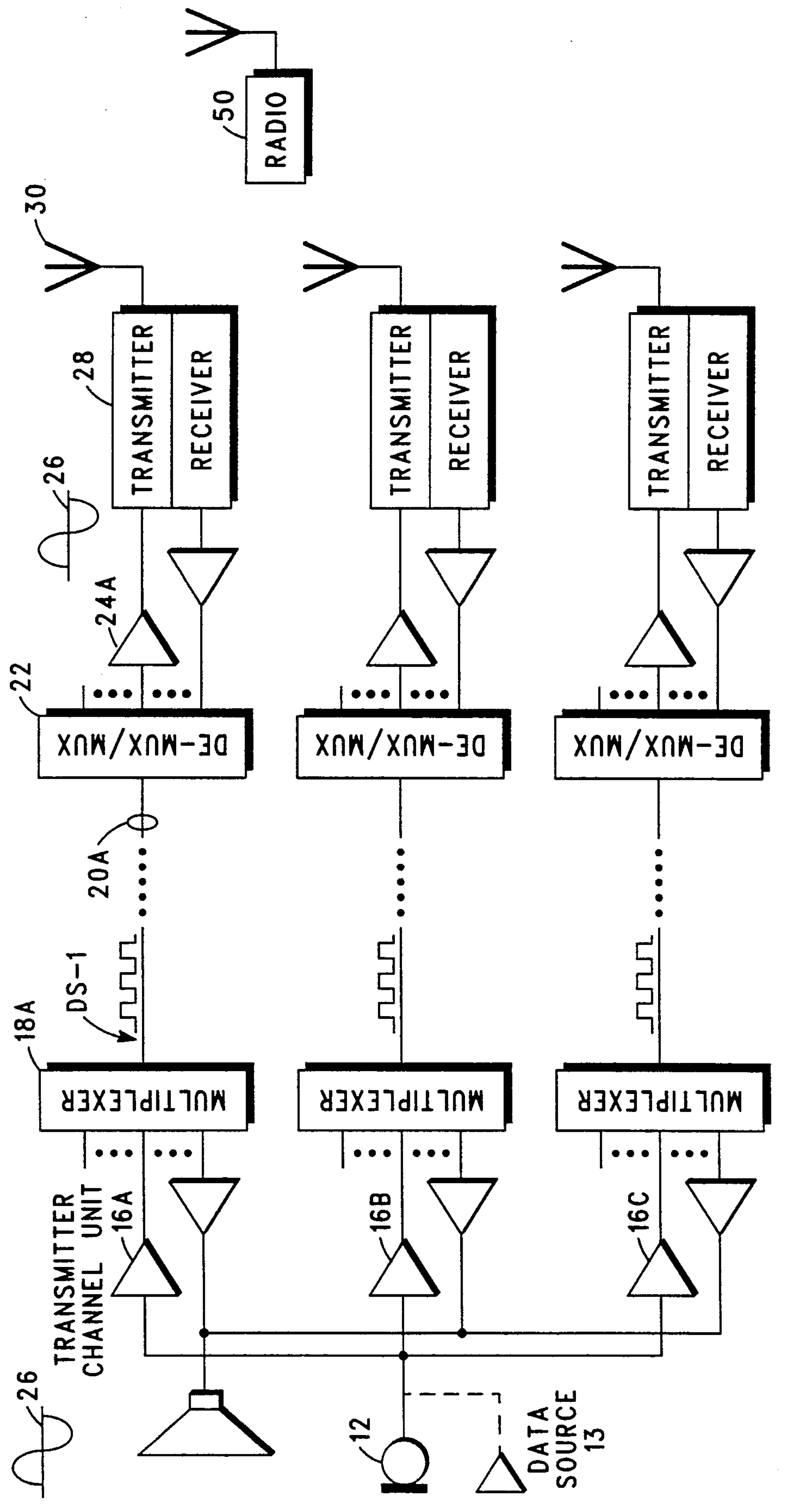
FIG. 1 is a functional block diagram of a simulcast transmission system.

FIG. 1 shows a generalized block diagram of a simulcast transmission system (10). A signal for broadcast (possibly including data from a data source 13) originates, for example, from a microphone (12), and is distributed to a plurality of communication channels that couple the microphone (12) to remote transmitters. The outgoing signal from the microphone (12) is sent to the transmit portions of channel units, (16A–16C) that converts the signal to a digital format for each communication channel. (Signal processing for each communication channel is identical; therefore only one channel will be described in detail.)

The digital signal from the channel unit (16A) is multiplexed with other digital signals in a DS-1 multiplexer (18A) to form a DS-1, pulse coded modulation serial bit stream of DS-1 PCM frames, (also referred to in the art as a DS-1 rate bit stream). DS-1 PCM is a serial bit stream at a nominal clock frequency of 1.544 megabits per second. The bit stream is comprised of frames of data words bounded by predictable terminal framing synchronizing framing bit patterns used to permit the identification of the bit positions and time slots of each frame, well known to those skilled in the art. The embedded signalling and framing bits are not pertinent to the invention herein disclosed.

Each DS-1 frame is comprised of 24 contiguous time intervals, each of the 24 time intervals allowing 8 data bits, representing the magnitude and polarity of a signal sampled in time, to be sent to a DS-1 receiver. The most significant bit of each 8-bit word in a time slot is a sign bit. The 7 bits adjacent the sign bit represent the magnitude of the signal when the particular sample was taken. A DS-1 receiver demultiplexes the 24 time slots and permits other circuitry to reconstruct an analog signal from the digital samples.

Digital data output of the channel unit (16A) is transferred to a DS-1 multiplexer (18A) that formats a DS-1 signal from data from the channel unit. The DS-1 output of the multiplexer (18A) passes over an appropriate communication link (20A). The communication link (20A) could be a microwave link, a pair of copper wires, co-ax cable, optical fiber, or any other media suitable for carrying the digital bit stream. The communication link (20A) merely carries the DS-1 data channel unit near the transmitter where the original signal is reconstructed by a receiving channel unit.

The receiving channel unit includes a demultiplexer (22) that converts the received serial DS-1 data into data words corresponding to individual time slots of the DS-1 frames. A second channel unit (24A) takes 8-bit data bytes from demultiplexer (22) and reconstructs the original analog wave form (26) of the original broadcast signal. Any data in the signal for broadcast that is embedded in the DS-1 signal is also reconstructed by the receiving channel unit, (24A). The output of the second channel unit (24A) is sent to a transmitter (28) where it modulates the transmitter for subsequent broadcast on an antenna (30) to a radio (50).

Use of the channel units (16A and 24A) substantially reduces distortion as compared to prior art methods of digitizing, transmitting and reconstructing a signal. Groups of samples output from the first channel unit (16A) are digitally processed to insure that the full 8-bits of each word are used to represent a sample of the signal from the microphone (12). This channel unit (16A) performs an adjustment to the digital samples that is analogous to the adjustment that an automatic gain control circuit performs on an analog signal. In the preferred embodiment, a digital signal processor chip, or DSP, is used.

When reconstructing the signal from the microphone (12) from the samples at the transmitter, the second channel unit (24A) removes adjustments made to samples by the transmitting channel unit (16A). Expanding the magnitude of digital samples prior to transmission, (as performed by the first channel unit (16A)) and contracting the magnitude of samples after transmission, (as performed by the receiving channel unit, (24A)) improves the SINAD ratio to better than 40 dB. The transmitting and receiving channel units (16A and 24A) are in one embodiment, the transmit and receive halves, respectively, of two channel units. Note that the invention disclosed herein contemplates a channel unit having both transmit and receive capability.

Figure 2:
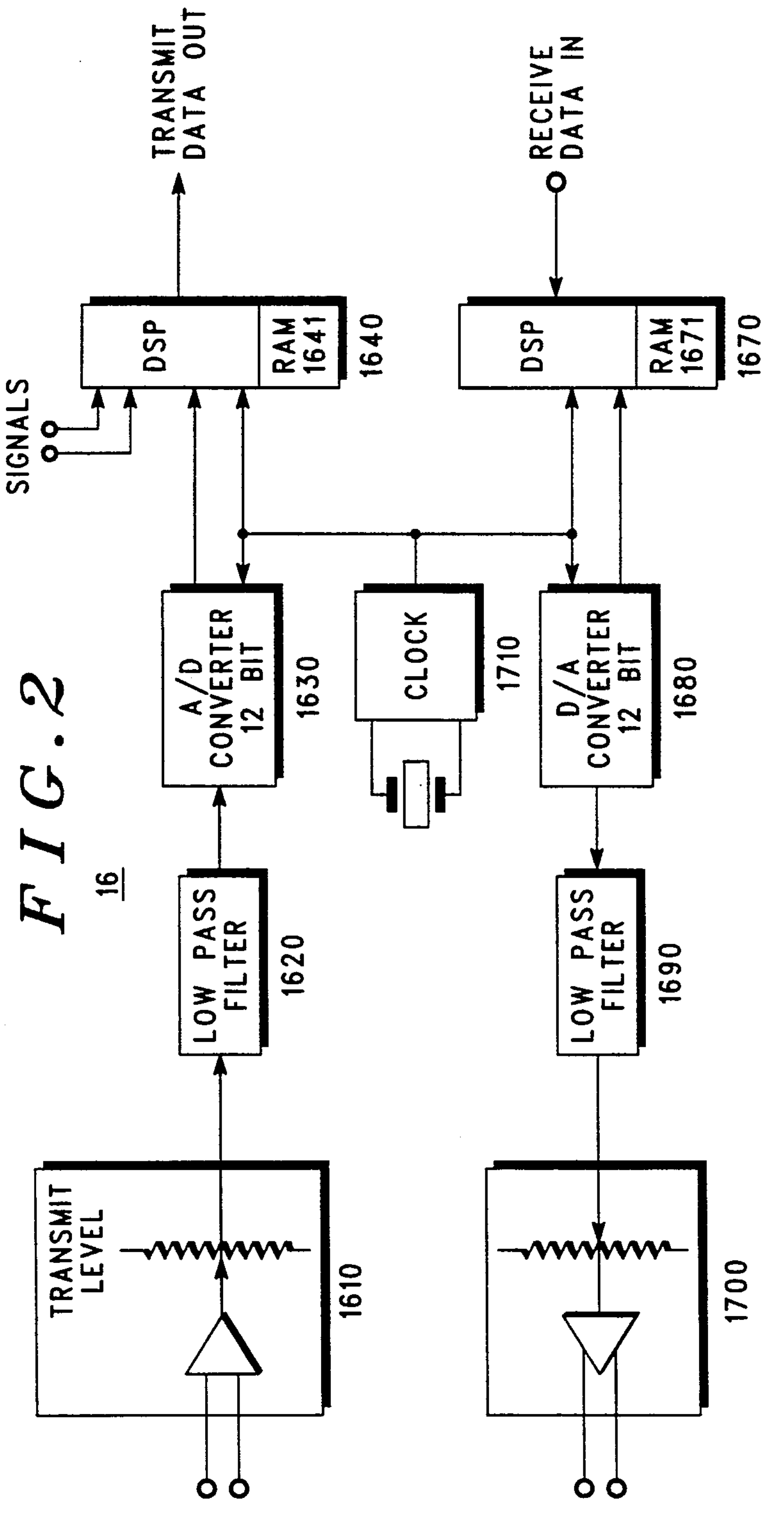
FIG. 2 is a functional block diagram of a channel unit for processing signals for broadcast and receive signals.

Referring to FIG. 2 a channel unit (16) will now be described. Incoming analog voice and data to be transmitted via the transmit portion of the channel unit (16) is received at a first audio stage (1610) that has a balanced 600 ohm input and provides some amplification. A low pass filter (1620) band-limits the incoming signal in accordance with Nyquist theory to insure that the analog to digital conversion and the subsequent digital to analog reconstruction permits faithful reproduction of the signal input to the first audio stage (1610). The output of the low pass filter (1620) is coupled to a 12-bit analog to digital converter, or A/D, (1630) that produces 12-bit data words that are samples of the signal input into the A/D produced at a rate controlled by a clock oscillator (1710). The conversion rate performed by the A-to-D converter (1630) must be at least equal to twice the highest frequency present in the signal after the low pass filter (1620).

Figure 4:
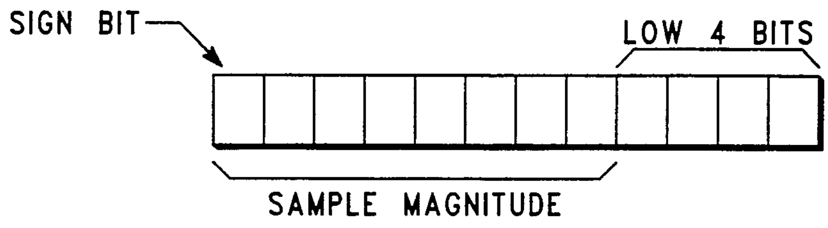
FIG. 4 shows the portion of the bit output from the A to D converter used in the circuit of FIG. 2.

Referring briefly to FIG. 4, there is shown a bit map of the 12-bit words output from the A-to-D converter (1630). The most significant bit is a sign bit that indicates the polarity of the accompanying number represented by the lower eleven bits.

Referring again to FIG. 2, the output of the A-to-D converter (1630) is passed to the DSP, (1640) that performs an analysis of data samples from the A-to-D converter (1630) and adjusts samples from the A-to-D converter (1630) to permit groups of samples from the A-to-D converter (1630) to be more accurately represented by 8-bit words. The DSP, (1640) also provides, as appropriate, time delays of a signal and signal amplification.

In this invention, the DSP (1640) also generates a separate and distinct block of data words, 24 bytes long, but comprised of three header bytes in a header block followed by 21 data bytes that have been processed by the DSP. Alternate embodiments might include a DSP which generates data frames of differing length and format subject to the limitation that the processing of values from the A/D remain substantially equivalent to the processing described below. The header block permits synchronization and communication between channel units.

During processing of data from the A/D converter (1630), the DSP (1640) tests 21 consecutive, 12-bit samples from the A/D converter (1630) to determine which of 21 consecutive samples represents the largest magnitude. The DSP (1640) then normalizes this largest sample and the other 20 voice samples in the 21 byte segment by left-shifting bits in all 21 bytes. This shifting increases the magnitude of the signal represented by the samples thereby effectively expanding the apparent magnitude of the source analog.

The normalization algorithm used in the preferred embodiment identifies the largest voice sample in 21 consecutive voice samples. After identifying this largest sample the DSP tests the sign bit of this sample. The bits of the sample, excluding the sign bit, are shifted left by the DSP (1640) until the sign bit and the bit adjacent the sign bit are of opposite polarity. The number of left-shifts required to accomplish this is repeated for the other 20 words in the block. This process is then repeated on the next 21 bytes of data.

Figure 3:
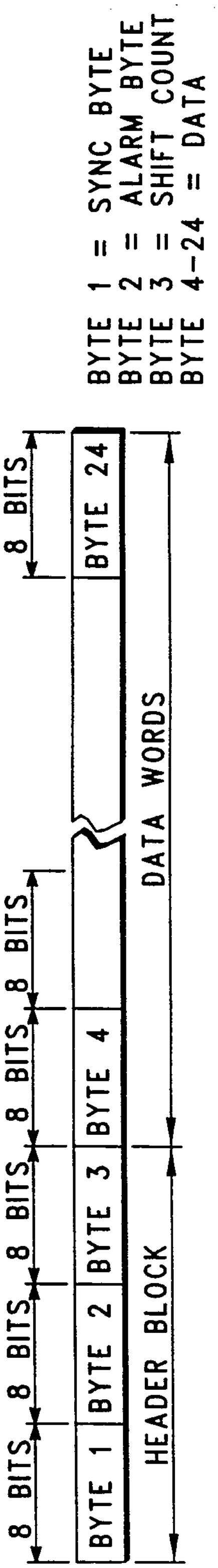
FIG. 3 shows the format of a frame of data output from the circuit of FIG. 2.

For example, if the sign bit is a 0, which in the preferred embodiment indicates a positive polarity voice sample, the DSP (1640) then tests the next most significant bit position to determine if it is a binary 1. If not, the DSP (1640) left-shifts the data word bits, (bit positions 1-7 in an 8-bit word) until the first bit position adjacent the sign bit (bit 6 in an 8-bit word) is a one, while simultaneously counting the number of left shifts required to move a 1 into this position. Upon concluding this step, the DSP (1640) records the number of left-shifts required and inserts this value into byte three of the three byte header mentioned above. (FIG. 3 shows the format of the 24-byte frame generated by the DSP (1640) and the location of byte 3.)

When analyzing the largest voice sample, the DSP (1640) also identifies when the sign bit of the largest sample is a 1 indicating that accompanying data bits represent a negative sample. In the preferred embodiment negative numbers are represented in two's compliment notation. If the accompanying data bits represent negative values, the remainder of the bit pattern present in this largest sample is left shifted until the next most significant bit is a 0. The number of left shifts required to move a 0 next to the sign bit is similarly recorded and stored by the DSP (1640) and placed into byte three of the header of the 24 byte frame of words sent from the DSP. The other 20 voice samples in the 21 block of voice samples are then shifted left by the same number of bit position as was the largest magnitude voice sample.

Note that if the DSP determines that the most significant bit position is a 0 and the next most significant bit position is a 1 no left shifting is performed. Similarly, if the most significant bit position is a 1 and coincidentally the next bit position is a 0, no shifting is performed. In either of these two cases, byte 3 is loaded with a 1, indicating that no left shifting is necessary for the 21 byte voice samples in that packet.

Referring again briefly to FIG. 3, the DSP (1640) loads byte one with a sync byte which is a recognizable bit pattern that a digital signal processor at the receiving end searches for. A receiving channel unit searches for, identifies and locks on to the data packet by recognizing the sync byte. Byte 2 is a link byte containing transmit alarm information and other control bits for the DS-1 transmission path. Byte 3, as detailed above, contains 3 scale factor bits indicating the number of left shifts required for each of the 21 following data bytes in the frame. Two signalling bits optionally may also be embedded into byte 3 as required.

Note that the DSP (1640) includes a section of RAM (1641) into which data values shown in FIG. 3 may be written and stored temporarily to be read out at some later time to the transmit data latch (1650). The DSP RAM (1641), which operates as a first-in first-out buffer readily adjusts delay of a signal input at the first audio stage port (1610). By controlling the write and read time of the RAM (1641) the DSP can carefully control delay between the program source (12) and the transmitter (28) as needed. Note also that the DSP (1640) can also multiply individual voice samples by predetermined scaling amounts. This multiplication effectively controls the level of a signal passing through the DSP (1640). (Note: multiplication of the samples to adjust amplitude of the signal is not identical to the scaling process described above. The multiplication process changes the magnitude of the signal for broadcast and will affect the modulation of the transmitter (28).

Referring to FIG. 1, reception, decoding and demodulation of such a signal is analogous to the process described above albeit in the opposite order. At the remote site, a DS-1 demultiplexer (22) receives the DS-1 serial bit stream and formats the serial bit stream into 24, 8-bit data words corresponding to the DS-1 time slots. The receiving channel unit (24A) receives the 8-bit voice sample generated by the transmitting channel unit (16A) and reconstructs the original analog wave form (26).

Referring again to FIG. 2, a second DSP (1670), examines all incoming data words for the sync byte to identify the start of a 24-byte frame of data described in FIG. 3. Having located the sync byte the DSP (1670) examines the alarm data in byte 2 and the left shift count in byte 3. All 21 data samples following byte three are right shifted by the left-shift count contained in byte 3. The DSP (1670) performs the right shifting of each of the next 21 data bytes. After right shifting each 8-bit word in the next 21 bytes, the DSP (1670) passes the data bytes to a 12 bit digital to analog convertor (1680) which, in conjunction with a low-pass filter (1690), reconstructs the original signal. A gain stage (1700) receives the analog signal from the low pass filter (1690) and generates a signal to modulate the remote site transmitter (28).

The conversion of normalized data words to unnormalized data words in the DSP (1670) is performed at a rate controlled by the clock (1710). Similarly, the digital to analog conversion (1680) is also controlled by the clock (1710) as shown. The receive processing must of course occur at the same rate as the transmit processing to minimize slip or other distortion caused by different bit rates at sending and receiving ends.

Figure 4A:
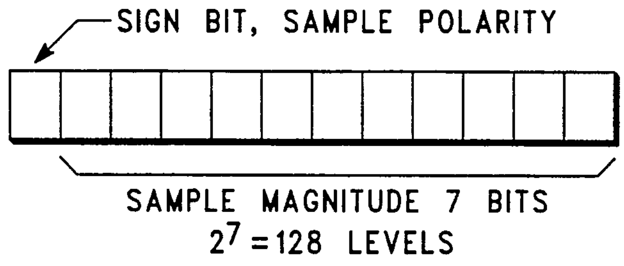
FIG. 4A shows the format of the digital data word output from the circuit FIG. 2 and an analog wave form.

The processing performed in the first DSP (1640) and reversed in the second DSP (1670) optimizes the SINAD ratio of the signal for broadcast. In a DS-1 frame comprised of 24, 8-bit samples, the simulcast system disclosed herein insures that all 8 bits of the time slots are used effectively to represent the signal being transmitted. Referring to FIG. 4A, there is shown an 8-bit word used by the PCM DS-1 format. The most significant bit of the 8 bit sample is a sign bit leaving 7 data bits to represent the magnitude of the data sample. Conventional telephony channel units typically use Mu law or A law companding which compresses a signal before or during digitization thereby allowing low amplitude signals to be represented accurately. In this invention however, the 7 magnitude data bits as shown in FIG. 4A are shifted so that low level signals produced in the analog to digital conversion are represented with the same digital accuracy as the large amplitude signals. The process of left shifting digital bits in the digital samples effectively scales the digitized format of the signal.

Figure 5:
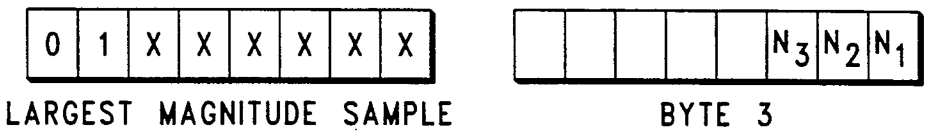
FIG. 5 shows the format of the most significant bit and the next most significant bit of a data word shown in FIG. 3.
Figure 6:
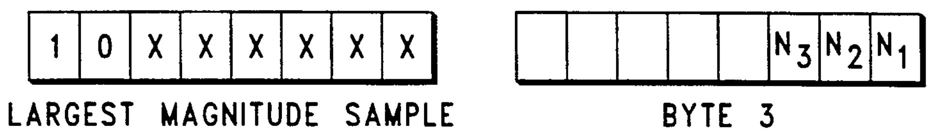
FIG. 6 shows the format similar to FIG. 5.

FIGS. 5 and 6 show typical bit patterns required of positive and negative samples produced after the normalization process. If a sample is positive as indicated by a zero, the remaining 7 data bits of the word are left shifted until bit 7 is a one. Similarly, if the sample magnitude is negative as indicated by a one in the most significant bit position. The remaining 7 data bits are left shifted until a zero occupies bit 7 as shown. The number of left shifts performed if the sample is positive or negative is recorded in byte 3 of the header as shown and sent to the receiving DSP.

Using the process described, an analog signal to be broadcast can have its SINAD ratio optimized. The time delay for transmit paths between the originating station and the remote transmitters can be carefully controlled using digital techniques. Similarly, the amplitude and phase differences between signals modulating individual remote transmitters can be carefully controlled using digital techniques.

Figure 1A:
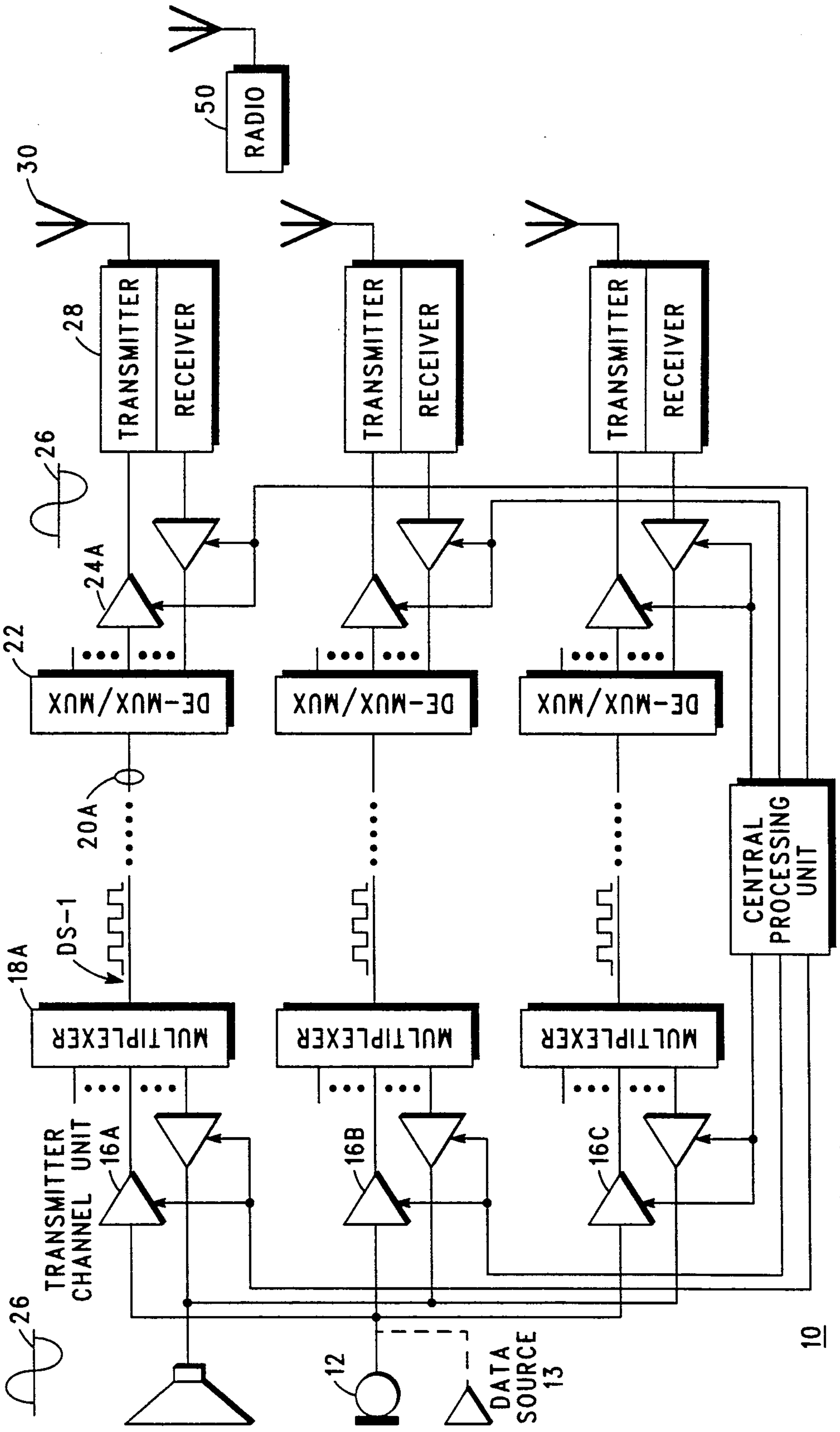
FIG. 1A shows a simulcast transmission system with a central computer.

A processor in the simulcast system (10) may be incorporated to control multiple DSP's (1640) and (1670) to adjust the amplitude adjustment and time delay in real time as shown in FIG. 1A. The function of the DSP's (1640 and 1670), as shown in FIG. 2, might be performed by a single device. Continuously adjusting time delay and amplitude using digital techniques and not shown in prior art permits the quality of reception to be optimized. The processor can adjust the transmitting and receiving DSP's additive time delay as well as amplification to insure that modulation of the remote transmitters is as identical as possible.

In the preferred embodiment, the digital signal processors (1640 and 1670) are Motorola DSP 56001. The analog to digital converters are PMI ADC9121HP, whereas the digital to analog converter is a PMI DAC8012P. The low pass filters were RC networks with 3-dB frequencies of 7 kHz. The function of the DSP's (1640 and 1670) could be performed with combinational logic or a microprocessor.

We claim:

1. In a simulcast transmission system having a central station, a plurality of remote transmit stations for substantially simultaneously transmitting a radio frequency signal modulated by a signal for broadcast, said simulcast transmission system having a plurality of transmission paths between said central station and said remote transmit stations, each transmission path having a first end at said central station and a second end at one of said remote transmit stations, each transmission path capable of having varying amplitude and time delay characteristics and carrying said signal for broadcast to said remote transmit stations, an improvement comprising:

first means for digitally processing said signal for broadcast at said first ends of said transmission paths into digital signal values, said first means for digitally processing said signal for broadcast, digitally compensating said signal for broadcast to compensate said signal for variations in at least amplitude and time delay characteristics in said transmission paths and for transmitting processed signal values over said transmission paths;

second means for digitally processing the transmitted processed signals at the second ends of said transmission paths, to provide a recovered signal for broadcast to transmitters at said remote transmit stations such that said transmitters are each provided with substantially identical modulating signals digitally compensated for variations in amplitude and time delay in said transmission paths.

2. The simulcast transmission system of claim 1 where said first means digitizes said signal for broadcast and adjusts said digital signal values by shifting digital samples of said signal for broadcast according to a first predetermined algorithm.

3. The simulcast transmission system of claim 2 where said second means processes signals at the second ends of said transmission paths to recover said signal for broadcast by reversing shifting of samples performed by said first means according to a second predetermined algorithm.

4. The simulcast transmission system of claim 1 where said first means formats digital samples of values into a packet comprising a plurality of samples and a header block.

5. The simulcast transmission system of claim 4 where said second means processes said packets.

6. The simulcast transmission system of claim 1 where said first means includes means for delaying said signal for broadcast.

7. The simulcast transmission system of claim 1 where said first means includes means for adjusting the amplitude of said signal for broadcast.

8. The simulcast transmission system of claim 6 where said means for delaying said signal for broadcast includes a random access memory array.

9. The simulcast transmission system of claim 6 where said means for delaying said signal for broadcast includes a first-in first-out memory.

10. The simulcast transmission system of claim 7 where said means for adjusting the amplitude of said signal for broadcast multiplies the value of digital samples by a scale factor.

11. The simulcast transmission system of claim 1 where said second means includes means for delaying provision of said recovered signal to said transmitters.

12. The simulcast transmission system of claim 11 where said means for delaying said recovered signal includes a random access memory.

13. The simulcast transmission system of claim 11 where said means for delaying said recovered signal includes a first-in, first-out memory.

14. The simulcast transmission system of claim 1 where said second means includes means for adjusting the amplitude of said recovered signal.

15. The simulcast transmission system of claim 14 where said second means for adjusting the amplitude of said recovered signal by multiplying digital samples by a scale factor.

16. The simulcast transmission system of claim 1 including means for remotely controlling said first means.

17. The simulcast transmission system of claim 1 including means for remotely controlling said second means.

18. The simulcast transmission system of claim 16 wherein said means for remotely controlling said first means includes a computer.

19. The simulcast transmission system of claim 17 wherein said means for remotely controlling said second means includes a computer.

20. The simulcast transmission system of claim 1 wherein said signal for broadcast includes a voice signal.

21. The simulcast transmission system of claim 1 wherein said signal for broadcast includes a data signal.

22. The simulcast transmission system of claim 1 wherein said signal for broadcast comprises both voice and data.

23. In a simulcast transmission system having a central station where a signal for broadcast originates, a plurality of remote transmit stations for substantially simultaneously transmitting a radio frequency signal modulated by said signal for broadcast, transmission paths between said central station and said transmit stations, each transmission path having a first end at said central station and a second end at one of said transmit stations and carrying said signal for broadcast, a method of improving transmission from said remote transmit stations comprising the steps of:

converting said signal for broadcast into N-bit digital words representing at least the magnitude and polarity of said signal at discrete time intervals;

adjusting the magnitude of said N-bit digital words by shifting M times, a portion of said N-bit words representing substantially the largest signal possible with $N-1$ bits;

transmitting magnitude adjusted N-bit digital words to said transmit stations;

at the transmit stations, receiving said adjusted N-bit words and re-adjusting the magnitude of said N-bit digital words by shifting M times said N-bit words; and reconstructing said signal for broadcast from said re-adjusted N-bit words.

24. The method of simulcasting a signal of claim 23 further including the step of time delaying said N-bit magnitude adjusted digital words prior to transmitting said N-bit words.

25. The method of simulcasting a signal of claim 23 further including the step of time delaying said readjusted N-bit digital words.

26. The method of claim 23 further including the step of adjusting the amplitude of said signal for broadcast.

27. The method of claim 26 further including the step of multiplying said N-bit samples by a scale factor.

* * * * *